Sept. 7, 1943. R. C. MARTIN 2,328,827
APPARATUS FOR STRETCHING THERMOSTRETCHABLE ELASTOPLASTIC FILM
Filed Feb. 12, 1942
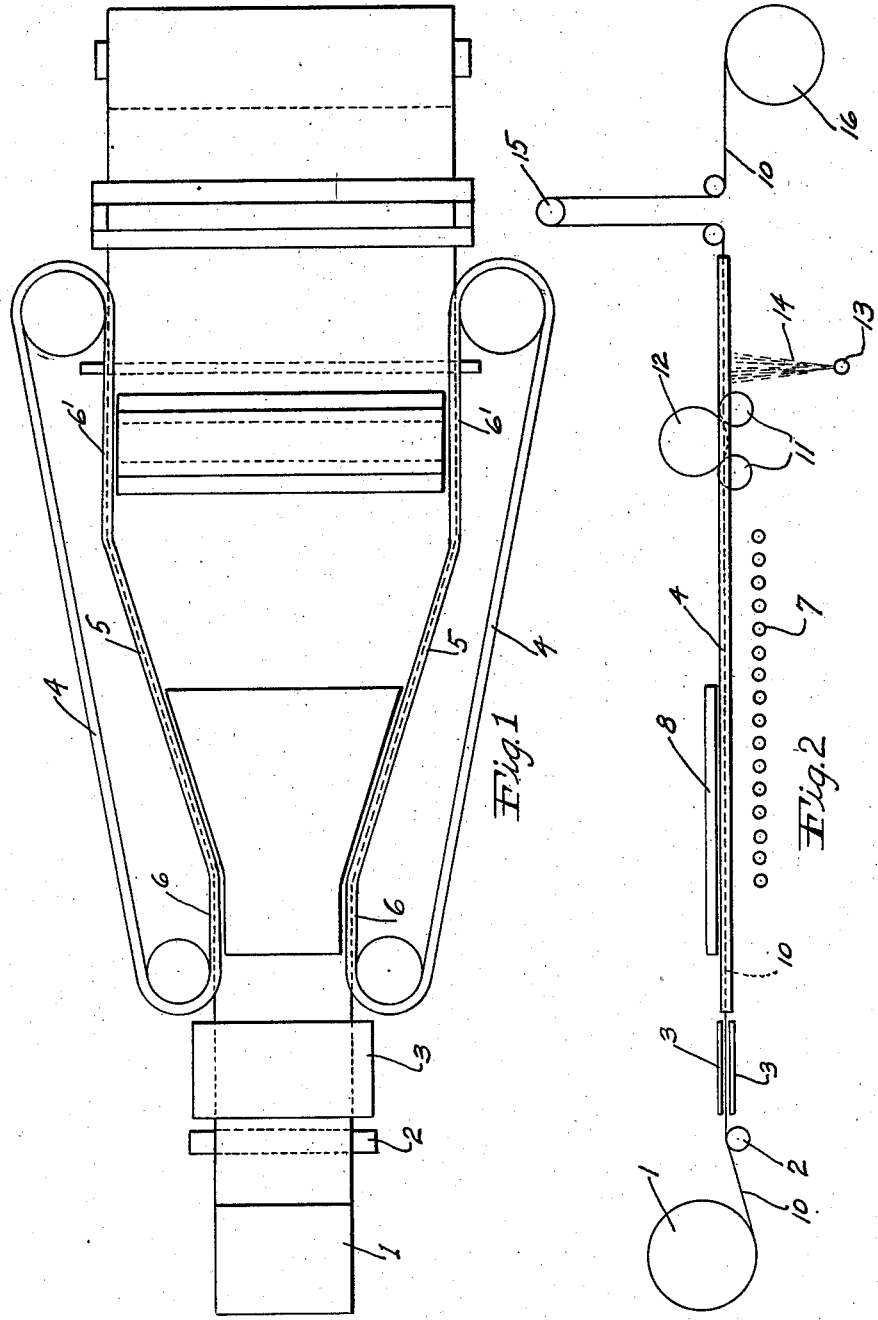
Inventor
Ralph C. Martin
By
Attorney Patented Sept. 7, 1943

2,328,827

UNITED STATES PATENT OFFICE 2,328,827

APPARATUS FOR STRETCHING THERMO-STRETCHABLE ELASTOPLASTIC FILM

Ralph C. Martin, Cuyahoga Falls, Ohio, assignor to Wingfoot Corporation, Akron, Ohio, a corporation of Delaware Application February 12, 1942, Serial No. 430,680

2 Claims. (Cl. 18—19)

This invention relates to apparatus for the lateral stretching of a thermostretchable, elastoplastic film, such as a rubber hydrochloride film.

Difficulty has been experienced in trying to obtain film which has been stretched laterally and which is uniformly stretched. When the stretching tension on the laterally stretched film is released the film becomes distorted. It is baggy. It cannot be spread flat without wrinkling.

In the apparatus of this invention the film is made flat by heating and the film is ironed while it is in a stretched condition, and then cooled while it is still in the stretched condition. A film stretched in this apparatus is uniformly flat.

Experiments have shown that the stress-strain curve of rubber hydrochloride film contains a plateau which indicates that during an initial stage of the stretching operation, no additional load is required to increase the elongation of the film. Therefore, when heated rubber hydrochloride film is gripped at the edges and stretched, the thinner portions of the film tend to stretch in preference to the thicker portions until the film is stretched to a point beyond the plateau, or, as it is technically described, a point beyond the B-point of the stress-strain curve. Stretching several hundred per cent, as indicated in the drawing, stretches the film beyond this B-point, and the film is, therefore, uniformly stretched throughout.

In stretching the film, if it is heated to above the melting point (which is about 230° plus or minus 10° F.) then thinnest portions of the film tend to thin out. Therefore, it is stretched below the melting point. The melting point will vary depending upon the amount of plasticizer present, etc.

In the apparatus of this invention, the heated film is preferably grasped between the jaws of tenter clips which pull the film apart. After the film has been stretched to the extent desired, it is ironed at a temperature above the melting point, as by pressing it against a heated roll. It is then preferably suddenly chilled, as by spraying with a fine mist of water before the stretching tension is released, although this cooling may be gradual. This ironing apparently removes strains within the film, and by setting the film while in this flattened condition the tendency of the film to become distorted is removed.

The invention will be further described in connection with the accompanying drawing which is more or less diagrammatic.

Fig. 1 is a plan view of apparatus which may be used for stretching the film; and Fig. 2 is an elevation.

The film to be stretched is taken from the roll 1. It is passed over the guide roll 2 and between the guide plates 3 into the jaws of tenter clips which are fastened to the chain tentering device 4 located on each side of the film. It may be necessary to use stronger springs than usual on the jaws of the clips. The tenter chains are first passed along parallel paths, then they diverge to cause the film to be stretched the desired amount, and then they again travel in parallel paths.

The diverging paths of the tenter are indicated by the numerals 5 and the two parallel paths by the numerals 6 and 6'. Steam coils 7 underneath the film heat it to the desired temperature. The hot plate 8 serves also to bring the film to the temperature required for stretching.

The film is indicated by the reference numeral 10. As the film, in the stretched condition, is carried by the tentering device along the parallel paths 6' it passes between the smaller supporting rolls 11 and the large heated roll 12 which heats the film. The weight of the roll 12 against the rolls 11 subjects the film to an ironing operation as it passes between them.

The perforated water pipe 13 throws a fine mist or spray 14 of water against the film immediately after it has been ironed. This cools or chills the film at least to room temperature and thus sets it in the stretched condition. If preferred, the film may be allowed to cool gradually to room temperature, but as it must be cooled while maintained under the stretching tension this necessitates elongation of the tenter chain.

After cooling the film is released from the tentering device, and then passes over the take-up roll 15 and is wound on the roll 16.

The take-up roll 15 is supported at each end between parallel uprights, and it is counter-balanced by weights at the ends of two cables which pass over pulleys and are fastened to opposite ends of the roll. The height of the roll varies depending upon the rate of feed of the film. Such a take-up device is usual in film-treating operations.

The means for heating the film may, of course, be varied without departing from the invention or the appended claims. The coils 7 and hot plate 8 of the accompanying drawing are merely illustrative of means that may be employed. In actual practice such a hot plate was maintained at 425° F. and 90 pounds of steam were used in the coils in stretching rubber hydrochloride film about 300 to 350%, thereby reducing it from about .005 to .0017 of an inch in thickness. The temperature of the coils, etc., may vary depending upon how well the whole apparatus is insulated. The air under the film and over the coils 7 should be in the neighborhood of 220 to 230° F. The film is heated almost to this temperature before stretching. The large ironing roll 12 will preferably be kept in the neighborhood of 250° F., although the temperature may be varied and the time of contact between the film and this roll will determine to some extent the temperature to which the roll must be heated. Conditions should be such that the film is here heated to a temperature somewhat above about 230° F.

Although the apparatus of this invention has been described more particularly as applied to the stretching of rubber hydrochloride film, it is applicable to the treatment of other thermostretchable, elastoplastic films, such as films of polyvinyl alcohol, Nylon, etc. The temperatures above given relate to the treatment of rubber hydrochloride film and, of course, other temperatures suitable for treating other films can readily be determined.

What I claim is:

1. Apparatus for the continuous lateral stretching of thermostretchable, elastoplastic film which comprises a tenter device comprising means for grasping each side of the film, guides for progressively widening the film-grasping means and beyond this parallel guides for maintaining the opposed film-grasping means parallel to one another, and between said parallel guides heating means for ironing the film.

2. Apparatus for the continuous lateral stretching of thermostretchable, elastoplastic film which comprises a tenter device comprising means for grasping each side of the film, guides for progressively widening the film-grasping means and beyond this parallel guides for maintaining the opposed film-grasping means parallel to one another, between said parallel guides heating means for ironing the film, and beyond this means for cooling the film within the parallel guides.

RALPH C. MARTIN.